United States Patent
Nishimura et al.

(10) Patent No.: US 11,762,955 B2
(45) Date of Patent: Sep. 19, 2023

(54) WASTE COLLECTING DEVICE, BUILDING, AND METHOD

(71) Applicant: Toyota Jidosha Kabushiki Kaisha, Toyota (JP)

(72) Inventors: Kazuya Nishimura, Anjyo (JP); Shin Sakurada, Toyota (JP); Yuko Mizuno, Nagoya (JP); Soutaro Kaneko, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/370,147

(22) Filed: Jul. 8, 2021

(65) Prior Publication Data

US 2022/0076050 A1   Mar. 10, 2022

(30) Foreign Application Priority Data

Sep. 4, 2020   (JP) ................................. 2020-149424

(51) Int. Cl.
| | |
|---|---|
| G06K 9/00 | (2022.01) |
| G06F 18/2431 | (2023.01) |
| G06T 7/00 | (2017.01) |
| B65F 1/00 | (2006.01) |

(52) U.S. Cl.
CPC ........ *G06F 18/2431* (2023.01); *G06T 7/0006* (2013.01); *B65F 1/00* (2013.01); *B65F 2210/168* (2013.01); *G06T 2207/10121* (2013.01)

(58) Field of Classification Search
CPC ............... G06K 9/628; G06T 7/0006; G06T 2207/10121; B65F 1/00; B65F 2210/168; B65F 2210/108; B65F 2210/138; B65F 1/1426; B65F 1/14; B65F 1/0033; B65F 2210/176; B65F 2210/178; G06V 20/60
See application file for complete search history.

(56) References Cited

U.S. PATENT DOCUMENTS

| | | | |
|---|---|---|---|
| 7,422,144 B1 * | 9/2008 | Importico | B65F 1/0093 193/31 R |
| 10,354,232 B2 * | 7/2019 | Tomlin, Jr. | G06Q 10/30 |
| 11,335,086 B2 * | 5/2022 | Jenkins | G06V 30/194 |
| 2007/0219645 A1 * | 9/2007 | Thomas | G05B 15/02 700/29 |

(Continued)

FOREIGN PATENT DOCUMENTS

| | | |
|---|---|---|
| CN | 107985841 A | 5/2018 |
| CN | 109703939 A | 5/2019 |

(Continued)

OTHER PUBLICATIONS

Li Dengxin, China Environmental Publishing House, Treatment and Disposal of Solid Wastes, Jul. 2014, 1st Edition, pp. 48-51.

*Primary Examiner* — Shervin K Nakhjavan
(74) *Attorney, Agent, or Firm* — Dinsmore & Shohl LLP (57) ABSTRACT

A waste collecting device includes an inlet unit, an acquisition unit configured to acquire waste information on waste thrown into the inlet unit, and a control unit configured to specify a category of the waste based on the waste information, determine whether the category of the waste matches a predetermined category, and output a determination result via an output unit.

17 Claims, 4 Drawing Sheets

(56) References Cited

U.S. PATENT DOCUMENTS

| | | | | |
|---|---|---|---|---|
| 2012/0029985 A1* | 2/2012 | Wilson | ............... | B65F 1/1426 |
| | | | | 705/308 |
| 2014/0379588 A1* | 12/2014 | Gates | ............... | G06Q 10/0631 |
| | | | | 705/308 |
| 2018/0243800 A1* | 8/2018 | Kumar | ............... | G06N 20/00 |
| 2019/0031436 A1* | 1/2019 | Aggarwala | ............... | B65F 1/0093 |
| 2020/0222949 A1* | 7/2020 | Murad | ............... | G09B 5/02 |
| 2021/0272073 A1* | 9/2021 | Chen | ............... | G06K 9/6201 |
| 2021/0287357 A1* | 9/2021 | Horowitz | ............... | G06K 9/6254 |
| 2021/0295039 A1* | 9/2021 | Jenkins | ............... | G06V 10/255 |

FOREIGN PATENT DOCUMENTS

| | | | |
|---|---|---|---|
| CN | 110342136 | A | 10/2019 |
| CN | 110482072 | A | 11/2019 |
| CN | 111532628 | A | 8/2020 |
| CN | 111582336 | A | 8/2020 |
| CN | 211253903 | U | 8/2020 |
| JP | H07126224 | A | 5/1995 |
| JP | 08-015493 | A | 1/1996 |
| JP | 08-085614 | A | 4/1996 |
| JP | 2004-018169 | A | 1/2004 |
| JP | 2006-124174 | A | 5/2006 |
| JP | 2007-126224 | A | 5/2007 |
| JP | 2010-020575 | A | 1/2010 |

\* cited by examiner

| CATEGORY | MATERIAL | ARTICLES | COLLECTING CONDITION |
|---|---|---|---|
| COMBUSTIBLE WASTE | PAPER, RUBBER, CLOTH, ••• | CD, VIDEO TAPE, ••• | SUNDAY TO THURSDAY |
| NON-COMBUSTIBLE WASTE | CERAMICS, GLASS, METAL, ••• | SMALL HOUSEHOLD APPLIANCE, LIGHT BULB, ••• | FRIDAY OR SATURDAY |
| ••• | ••• | ••• | ••• |

FIG. 3

| ACCOUNT INFORMATION | NUMBER OF TIMES OR FREQUENCY OF NON-SORTING | MAINTENANCE FEE |

...

WASTE COLLECTING DEVICE, BUILDING, AND METHOD

CROSS-REFERENCE TO RELATED APPLICATION

This application claims priority to Japanese Patent Application No. 2020-149424 filed on Sep. 4, 2020, incorporated herein by reference in its entirety.

BACKGROUND

1. Technical Field

The present disclosure relates to a waste collecting device, a building, and a method.

2. Description of Related Art

Methods for collecting waste in a building such as an apartment complex are well-known. For example, Japanese Unexamined Patent Application Publication No. 2007-126224 discloses that a waste inlet unit is installed on each floor of a building to collect waste thrown therein.

SUMMARY

In recent years, there has been an increased demand for waste sorting in order to reduce adverse effects on the environment. However, conventional methods are not always suitable for waste sorting. Therefore, methods of collecting waste can still be further improved.

The present disclosure provides an improved method of collecting waste.

A waste collecting device according to one embodiment of the present disclosure includes an inlet unit, an acquisition unit configured to acquire waste information on waste thrown into the inlet unit, and a control unit configured to specify a category of the waste based on the waste information, determine whether the category of the waste matches a predetermined category, and output a determination result via an output unit.

A building according to one embodiment of the present disclosure is a building provided with a waste collecting device. The waste collecting device includes an inlet unit, an acquisition unit configured to acquire waste information on waste thrown into the inlet unit, and a control unit configured to specify a category of the waste based on the waste information, determine whether the category of the waste matches a predetermined category, and output a determination result via an output unit.

A method according to one embodiment of the present disclosure is a method executed by a waste collecting device which includes an inlet unit, an acquisition unit, and a control unit. The method includes a step of acquiring, by the acquisition unit, waste information on waste thrown into the inlet unit, a step of specifying, by the control unit, a category of the waste based on the waste information, a step of determining, by the control unit, whether the category of the waste matches a predetermined category, and a step of outputting, by the control unit, a determination result via an output unit.

With one embodiment of the present disclosure, it is possible to provide an improved method of collecting waste.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described.

Outline of Embodiment

Figure 1:
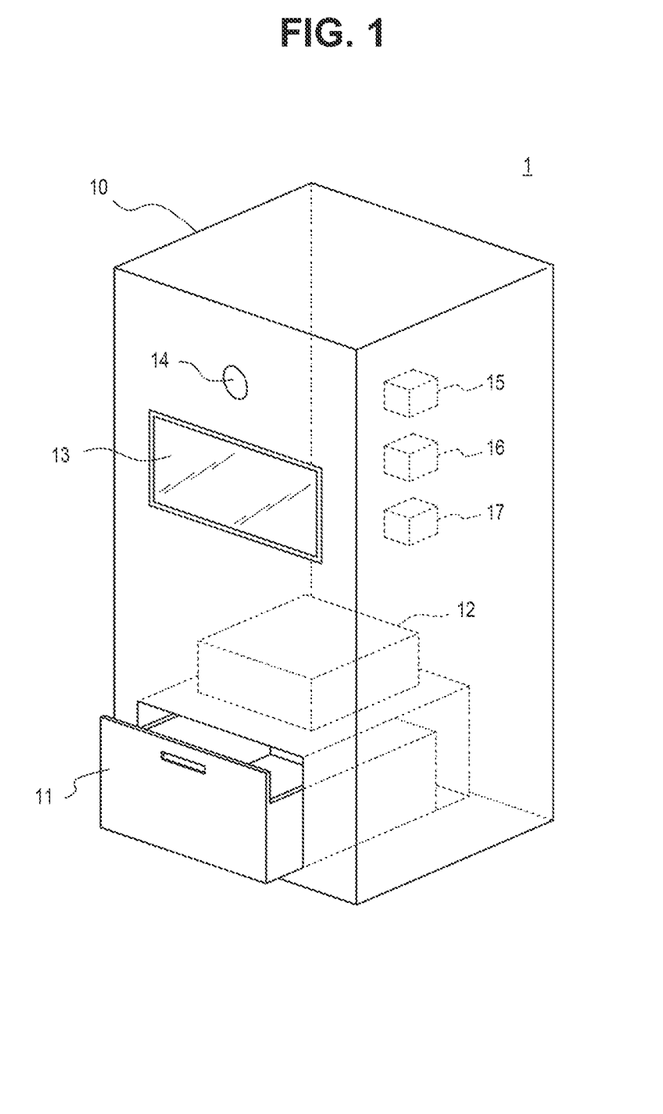
FIG. 1 is a diagram illustrating a schematic configuration of a waste collecting device installed in a building according to one embodiment of the present disclosure.

Referring to FIG. 1, an outline of a building 1 according to one embodiment of the present disclosure will be described. The building 1 may be, for example, an apartment complex or building, but is not limited thereto. The building 1 includes a waste collecting device 10. The waste collecting device 10 is a device that collects waste thrown therein by a user who lives in the apartment complex. The waste collecting device 10 may be installed as a built-in device of the building 1, or may be assembled after the building 1 is constructed.

First, the outline of the present embodiment will be described, and the details will be described later. The waste collecting device 10 acquires, for example, waste information on waste thrown therein by a resident of the building 1. The waste collecting device 10 specifies a category of the waste based on the waste information and determines whether the category matches a predetermined category. The waste collecting device 10 accordingly outputs a determination result.

In the present embodiment, a plurality of categories is set in advance, such as "combustible waste" or "non-combustible waste." The plurality of categories may be defined pursuant to any rules on waste sorting, such as laws and ordinances. The predetermined category is one of the plurality of categories. The predetermined category may differ depending on, for example, days of the week or periods of time. The predetermined category may be selected from among the plurality of categories pursuant to any rules on waste sorting.

As described above, according to the present embodiment, the user who has thrown the waste into the waste collecting device 10 can recognize whether a category of the waste thrown therein matches the predetermined category. Consequently, it is possible to urge a user who does not comply with waste sorting rules to sort the waste. Therefore, the method of collecting waste can be improved as the user is encouraged to sort the waste.

A schematic configuration of the waste collecting device 10 will be described in detail hereinbelow.

Configuration of Waste Collecting Device

As shown in FIG. 1, the waste collecting device 10 includes an inlet unit 11, an acquisition unit 12, an output unit 13, an input unit 14, a communication unit 15, a storage unit 16, and a control unit 17. FIG. 1 is a schematic diagram illustrating a schematic configuration of the waste collecting device 10. Each component may have optional shapes, positions, sizes, and the like, and is not limited to that shown in the drawing.

The inlet unit 11 is formed of an optional member structured such that it can be opened and closed by the user, and has a storage space for the waste thrown therein. A plurality of inlet units 11 may be provided. The inlet unit 11 shown in FIG. 1 is formed of a drawer-shaped member, but is not limited thereto. The inlet unit 11 may be formed of, for example, a rocker-shaped member having a door that can be opened and closed.

The inlet unit 11 is controlled to be locked or unlocked by the control unit 17 as described later. For example, the inlet unit 11 is unlocked when the user is successfully authenticated, and can be opened by the user. The user throws waste contained in, for example, a plastic bag or a container, or bundled with string, into the inlet unit 11. The user closes the inlet unit 11 after throwing the waste therein, and then the inlet unit 11 is locked. The waste storage space is sealed when the inlet unit 11 is closed and locked.

In a case where the acquisition unit 12 includes an X-ray inspection device as described later, the inlet unit 11 has a structure and material such that X-rays do not leak to the outside from the sealed storage space. For example, the storage space of the inlet unit 11 may be surrounded by lead.

The acquisition unit 12 includes an optional device that carries out non-destructive inspection to acquire waste information on the waste thrown into the inlet unit 11. For example, the acquisition unit 12 may include a metal detection device, an X-ray inspection device, a temperature detection device, or a combination thereof.

The metal detection device is an optional device capable of detecting metal contained in the waste by non-destructive inspection. In a case where the acquisition unit 12 includes the metal detection device, the waste information may include information indicating whether the waste contains metal.

The X-ray inspection device includes, for example, an X-ray fluoroscopic inspection device, a backscatter X-ray inspection device, a fluorescent X-ray inspection device, or a combination thereof. The X-ray fluoroscopic inspection device and the backscatter X-ray inspection device can generate an X-ray fluoroscopic image and a backscatter X-ray image, respectively. The fluorescent X-ray inspection device is capable of carrying out elemental analysis. In a case where the acquisition unit 12 includes the X-ray inspection device, the waste information may contain the X-ray fluoroscopic image, the backscattered X-ray image, information on elemental analysis results, or a combination thereof, of the waste.

The temperature detection device is an optional device which can detect a temperature on a surface of or inside the waste in a non-contact manner. For example, the temperature detection device may include a thermography device, an ultrasonic temperature sensor, or a combination thereof. In a case where the acquisition unit 12 includes the temperature detection device, the waste information may include information indicating the temperature of the waste (surface temperature or internal temperature).

In the present embodiment, the acquisition unit 12 will be described as including the metal detection device, the X-ray inspection device, and the temperature detection device.

The output unit 13 includes one or more output devices that output information for notifying the user. For example, the output device may be, but is not limited to, a display that outputs information as a video, or a speaker that outputs information as audio. Alternatively, the output unit 13 may include an interface that outputs information to an external output device.

The input unit 14 includes one or more input devices that detect an input that is input to the waste collecting device 10. For example, the input device may be, but is not limited to, a physical key, a capacitance key, a touchscreen integrally provided with the display of the output unit 13, a microphone that accepts voice input, a near field communication (NFC) reader, or a biometric information acquisition device (for example, a camera used for face recognition, a fingerprint sensor, or a vein sensor). Alternatively, the input unit 14 may include an interface that acquires information from an external input device.

The communication unit 15 includes one or more communication interfaces connected to a network such as a LAN (local area network), a MAN (metropolitan area network), or a WAN (wide area network). The communication interface corresponds to a mobile communication standard such as 4G (4th generation) or 5G (5th generation), or a wired LAN (local area network) or a wireless LAN standard, but the communication interface is not limited thereto. In the present embodiment, the waste collecting device 10 is connected to the network via the communication unit 15.

The storage unit 16 includes one or more memories. The "memory" herein may be, for example, a semiconductor memory, a magnetic memory, or an optical memory, but is not limited thereto. Each memory included in the storage unit 16 may function as, for example, a main storage device, an auxiliary storage device, or a cache memory. The storage unit 16 stores random information used in the operations of the waste collecting device 10. The storage unit 16 may store, for example, a system program, an application program, embedded software, and the like. The information stored in the storage unit 16 may be updated by, for example, information acquired from the network via the communication unit 15.

In the present embodiment, the storage unit 16 stores information indicating waste collecting rules and user data.

The waste collecting rules are optional rules on waste sorting, such as laws and ordinances. For example, the information indicating waste collecting rules may be set according to the operation of the waste collecting device 10, or may be downloaded via the network.

Figure 2:
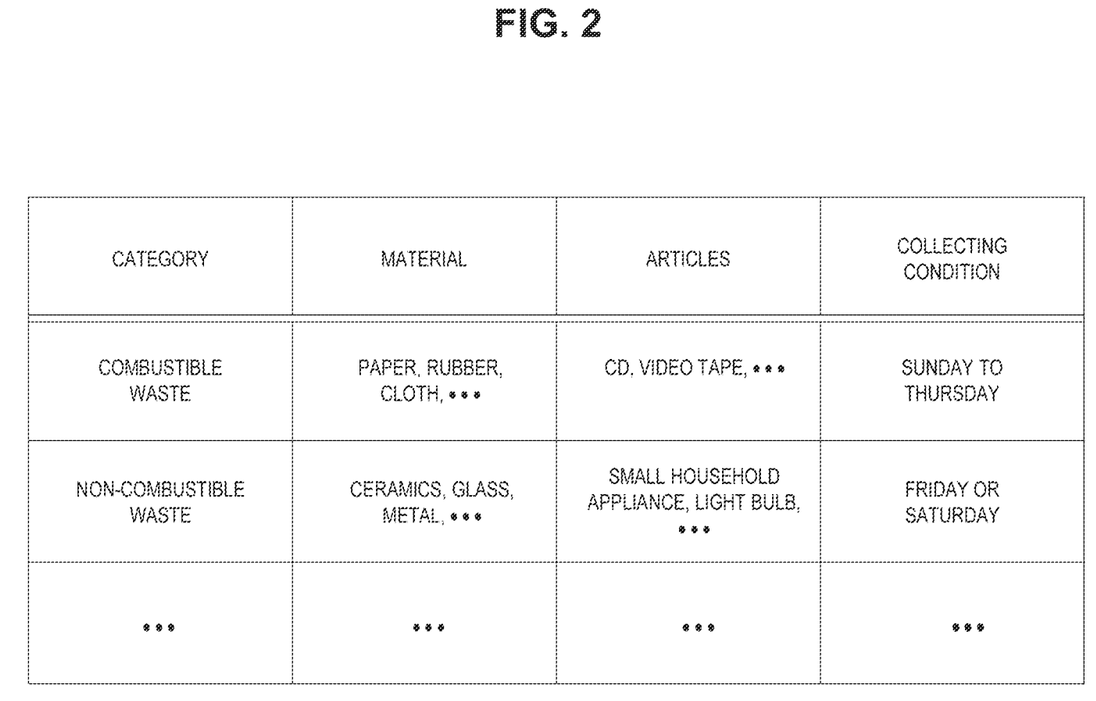
FIG. 2 is a diagram illustrating an example of information indicating waste collecting rules.

In the example shown in FIG. 2, the information indicating waste collecting rules includes "material", "articles" and "collecting condition" for each "category" of the waste. The example shown in FIG. 2 includes two categories, combustible waste and non-combustible waste. Materials corresponding to combustible waste include paper, rubber, cloth, and the like. Articles corresponding to combustible waste include CDs (compact disks), video tapes, and the like. The collecting condition for combustible waste is a day of the week, and the condition is whether today is one of days from between Sunday to Thursday. This information indicates that waste of which the material may be, for example, paper, or waste of which the articles may be, for example, a CD, can be sorted and collected as combustible waste within a period from Sunday to Thursday. On the other hand, materials corresponding to non-combustible waste include ceramics, glass, metals, and the like. Articles corresponding to non-combustible waste include small household appliances and light bulbs. The collecting condition for non-combustible waste is a day of the week, and the condition is whether today is either of Friday or Saturday. This information indicates that waste of which the material is, for example, ceramics, or waste of which the articles are, for example, a small household appliance, can be sorted and collected as non-combustible waste on Friday or Saturday.

Figure 3:
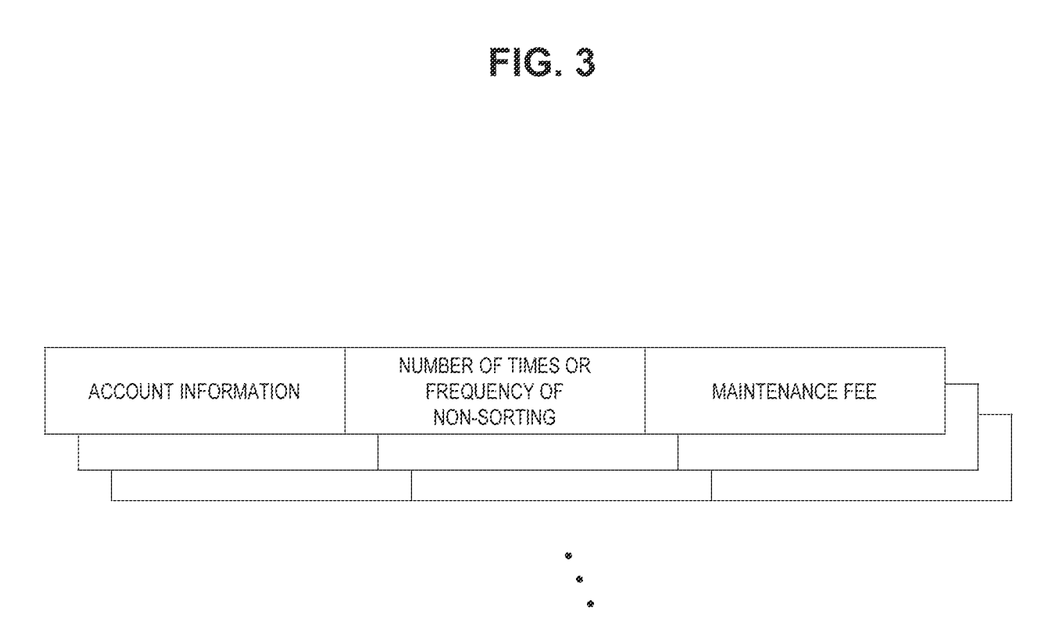
FIG. 3 is a diagram illustrating an example of user data.

The user data includes optional information on the user who uses the waste collecting device 10. In the present embodiment, the user data is stored for each household of the building 1, which is an apartment complex, but the user data may be stored for each user.

In the example shown in FIG. 3, the user data includes "account information", "number of times or frequency of non-sorting", and "maintenance fee." The account information is optional information used to identify and authenticate a household. For example, the account information includes, but is not limited to, identification information (for example, room number) for identifying the household, and password or biometric information for authenticating the household (for example, face data, fingerprint data, or vein data of each user belonging to the household). The number of times or frequency of non-sorting means the number of times that or the frequency at which the household does not correctly, according to the collecting rules stated above, sort the waste thrown into the waste collecting device 10 during a predetermined period. The maintenance fee refers to the amount of the management costs for the building 1 that the household should pay. As will be described later, for example, the household that has a larger number of times or a higher frequency of non-sorting may be charged higher management costs.

In FIG. 1, the control unit 17 includes one or more processors, one or more programmable circuits, one or more dedicated circuits, or a combination thereof. The processor is, for example, a general-purpose processor such as a central processing unit (CPU) or a graphics processing unit (GPU), or alternatively, a dedicated processor specialized for specific processing, but is not limited thereto. The programmable circuit is, for example, a field programmable gate array (FPGA), but is not limited thereto. The dedicated circuit is, for example, an application specific integrated circuit (ASIC), but is not limited thereto. The control unit 17 controls the overall operation of the waste collecting device 10.

Operation Flow of Waste Collecting Device

Figure 4:
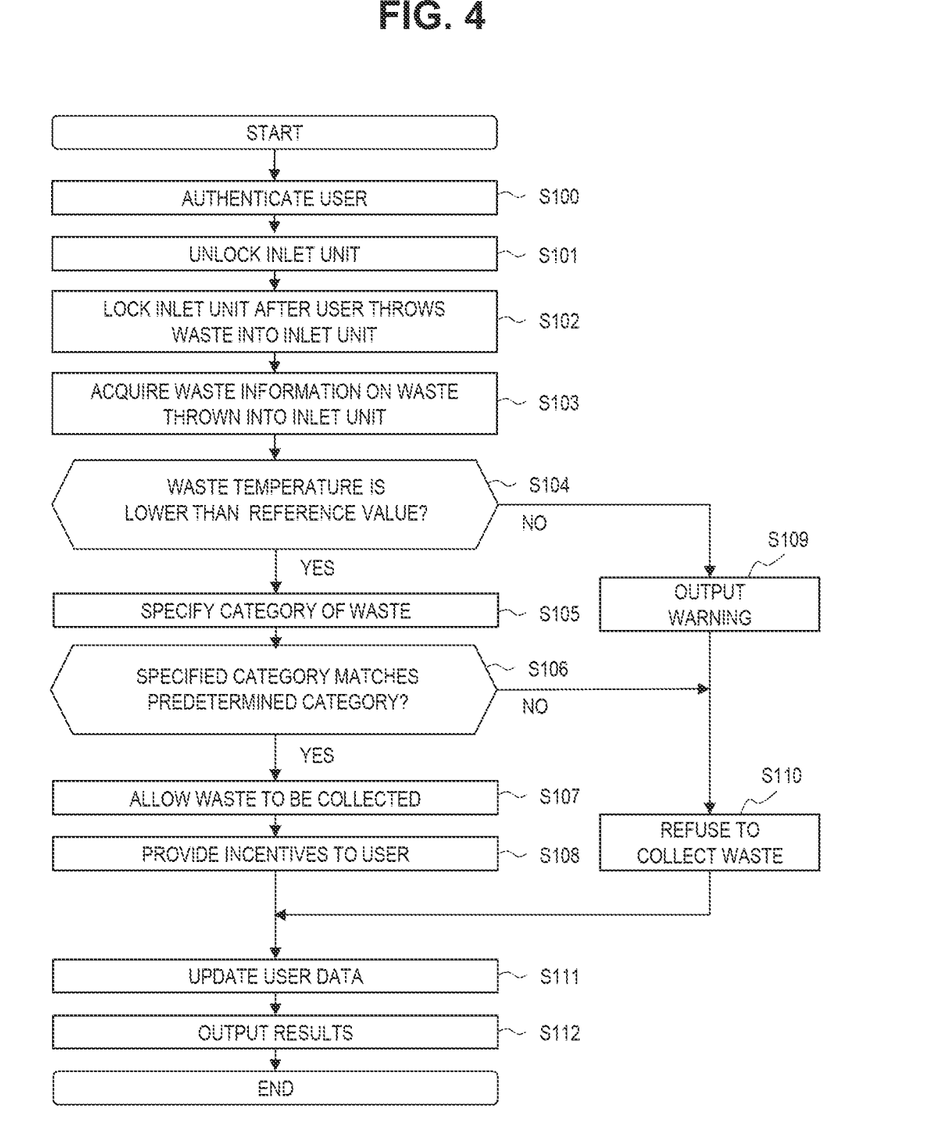
FIG. 4 is a flowchart illustrating an operation of the waste collecting device.

Referring to FIG. 4, the operation of the waste collecting device 10 will be described hereinbelow. The operation is activated, for example, in response to a predetermined user input that is input to the waste collecting device 10, but is not limited thereto.

Step S100: The control unit 17 authenticates the user who throws the waste into the inlet unit 11.

Any method can be adopted for user authentication. For example, the control unit 17 acquires the account information from the user via the input unit 14. As described above, the account information includes, for example, identification information for identifying the user's household, and password or biometric information for authenticating the household. The identification information and password may be input by the user using, for example, a physical key, or may be read from the user's card key or smartphone using an NFC reader. The control unit 17 authenticates the user by using the account information acquired from the user and the account information stored in the storage unit 16. If the user authentication fails, the control unit 17 may attempt to acquire the account information from the user again.

Step S101: The control unit 17 unlocks the inlet unit 11 when the user authentication is successful. When the inlet unit 11 is unlocked, the user can open the inlet unit 11 and throw the waste therein.

Step S102: The control unit 17 locks the inlet unit 11 when the inlet unit 11 is closed after the user has thrown the waste therein.

Step S103: The acquisition unit 12 carries out non-destructive inspection to acquire waste information on the waste thrown into the inlet unit 11. Hereinbelow a case will be described where the acquired waste information includes information indicating whether the waste contains metal, an X-ray fluoroscopic image, a backscattered X-ray image, and information indicating the waste temperature.

Step S104: The control unit 17 determines whether the waste temperature is lower than a reference value. The reference value may be optionally set. For example, the reference value is set such that, in a case where a heat source such as an unextinguished cigarette butt or a heated battery is contained in the waste, the waste temperature is determined to be equal to or higher than the reference value. In other words, the control unit 17 determines whether the waste contains a heat source based on the comparison between the waste temperature and the reference value. In a case where it is determined that the waste temperature is lower than the reference value, that is, in a case where it is determined that the waste does not contain a heat source (step S104: YES), the process proceeds to step S105. Meanwhile, in a case where it is determined that the waste temperature is equal to or higher than the reference value, that is, in a case where it is determined that the waste contains a heat source (step S104: NO), the process proceeds to step S109.

Step S105: The control unit 17 specifies a category of the waste based on the information of the waste thrown into the inlet unit 11.

Any method can be adopted for specifying the category of the waste. In the present embodiment, the control unit 17 specifies at least one of the material of the waste and the articles contained in the waste based on the information of the waste thrown into the inlet unit 11.

The material contained in the waste can be specified by using at least one of the metal detection device and the X-ray inspection device. In particular, it is possible to specify whether the waste contains metal with the metal detection device. Additionally, it is also possible to specify whether the waste contains rubber, plastic, ceramics, glass, stone, metal, or the like, by using the X-ray inspection device.

The articles contained in the waste can be specified by using the X-ray image obtained from the X-ray inspection device. In particular, the articles contained in the waste can be specified by executing an optional image recognition process, which employs, for example, pattern matching or machine learning on at least one of the X-ray radiography and the backscattered X-ray image.

Step S106: The control unit 17 determines whether the category of the waste thrown into the inlet unit 11 matches the predetermined category.

In particular, the control unit 17 specifies a category satisfying the collecting condition, from among the plurality of categories described in the waste collecting rules stored in the storage unit 16, as the predetermined category. According to the collecting rules shown in FIG. 2, for example, the waste categorized as "combustible waste" satisfying the collecting condition "Sunday to Thursday" is specified as the predetermined category on Monday, and the garbage categorized as "non-combustible waste" satisfying the collecting condition "Friday or Saturday" is specified as the predetermined category on Saturday. The control unit 17 determines whether the category of the waste thrown into the inlet unit 11 matches the predetermined category. In other words, the control unit 17 determines whether the category of the waste thrown into the inlet unit 11 complies with the collecting rules.

In a case where it is determined that the category of the waste matches the predetermined category, that is, in a case where it is determined that the waste complies with the collecting rules (step S106: YES), the process proceeds to step S107. Meanwhile, in a case where it is determined that the category of the waste does not match the predetermined category, that is, in a case where it is determined that the waste does not comply with the collecting rules (step S106: NO), the process proceeds to step S110.

Step S107: The control unit 17 allows the waste thrown into the inlet unit 11 to be collected.

The waste that is allowed to be collected may be stored in the storage space of the inlet unit 11 until it is collected by, for example, a worker, a robot, or an autonomous vehicle that collects waste. In such a case, the control unit 17 unlocks the inlet unit 11 as the worker operates the waste collecting device 10, or as the robot or the autonomous vehicle approaches the waste collecting device 10.

Alternatively, the waste that is allowed to be collected may be transferred to a waste pit provided in the building 1. Any unit can be adopted for transferring the waste. For example, the waste collecting device 10 may include a transfer device such as a conveyor belt that transfers the waste thrown into the inlet unit 11 to the waste pit of the building 1. In such a case, the control unit 17 transfers the waste thrown into the inlet unit 11 to the waste pit of the building 1 by driving the transfer device.

Step S108: The control unit 17 provides incentives to the user. The incentives refer to compensation given to the user to sort the waste according to the collecting rules. A type of the incentive may be optionally determined. For example, the incentive may be a tangible item such as cash or a gift. Alternatively, the incentive may be an intangible object such as electronic money or credits. After step S108 ends, the process proceeds to step S111.

Step S109: In a case where it is determined in step S104 that the waste temperature is equal to or higher than the reference value (step S104: NO), the control unit 17 outputs a warning via the output unit 13. The warning includes, for example, a message indicating that the waste contains a heat source, but is not limited thereto. The warning may be optionally defined.

Step S110: After step S109 ends, or in a case where it is determined in step S106 that the category of the waste does not match the predetermined category (step S106: NO), the control unit 17 refuses to collect the waste thrown into the inlet unit 11. The refused waste may be returned to the user. In such a case, the control unit 17 unlocks the inlet unit 11.

Step S111: After step S108 or S110 ends, the control unit 17 updates the user data stored in the storage unit 16.

In particular, the control unit 17 updates the user data stored in the storage unit 16, i.e., the number of times or frequency of non-sorting, and the maintenance fee. For example, in a case of where step S108 is executed, the control unit 17 may decrease the number of times or frequency of non-sorting, and reduce the maintenance fee. Meanwhile, in a case where step S110 is executed, the control unit 17 may increase the number of times or frequency of non-sorting, and increase the maintenance fee. The maintenance fee may be updated at a timing that is different from a timing when the number of times or frequency is updated. In particular, the control unit 17 updates the number of times or frequency of non-sorting every time waste is thrown into the inlet unit 11, while the control unit updates the maintenance fee according to a billing cycle (for example, once a month).

Step S112: The control unit 17 outputs the result of processes up to step S111 via the output unit 13. In particular, the result of processes up to step S111 may output the waste information acquired in step S103, the category of the waste specified in step S105, the information on the determination as to whether the category of the waste matches the predetermined category carried out in step S106, the information indicating that the waste is allowed to be collected in step S107, the information indicating that incentives are given in step S108, the information indicating that the waste collection is refused in step S110, the information indicating that the user data is updated in step S111, or a combination thereof.

As described above, the waste collecting device 10 according to the present embodiment acquires the waste information on the waste thrown into the inlet unit 11. The waste collecting device 10 specifies the category of the waste based on the waste information and determines whether the category matches a predetermined category. The waste collecting device 10 accordingly outputs the determination result via the output unit 13.

With this configuration, the user who has thrown the waste into the waste collecting device 10 can recognize whether a category of the waste thrown therein matches the predetermined category. Consequently, it is possible to urge a user who does not comply with waste sorting rules to sort the waste. Therefore, the method of collecting waste can be improved as the user is encouraged to sort the waste.

Although the present disclosure has been described based on the drawings and examples, it should be noted that those skilled in the art may make various changes and modifications based on the present disclosure. Therefore, those variations and modifications are encompassed in the scope of the claims of the present disclosure. For example, functions included in each element, each step, and the like, can be rearranged so as to be without logical contradiction, and it is possible to combine elements into a single component or divide a plurality of elements or steps.

For example, in the embodiment stated above, a part or all of the operations executed by the waste collecting device 10 may be distributed to a plurality of information processing apparatuses capable of communicating with each other.

Further, in the embodiment stated above, a case where the control unit 17 of the waste collecting device 10 specifies the category of the waste thrown into the inlet unit 11 has been described. In a case where waste contained in a plastic bag or a container, or bundled by string, is thrown into the inlet unit 11, a plurality of categories can be specified for the waste. For example, according to the collecting rules shown in FIG. 2, when both a CD and a small household appliance are contained in the waste thrown into the inlet unit 11, two categories of "combustible waste" and "non-combustible waste" are specified. In a case where the plurality of categories are specified to the waste thrown into the inlet unit 11, it is highly likely that the waste is not sorted according to the collecting rules. Therefore, in a case where the plurality of categories can be specified for the waste thrown into the inlet unit 11, the control unit 17 may refuse to collect the waste without determining whether the waste is the category that matches the predetermined category.

Furthermore, the control unit 17 of the waste collecting device 10 may determine whether the waste thrown into the inlet unit 11 contains harmful substances based on the elemental analysis result obtained from the X-ray inspection device of the acquisition unit 12. For example, the harmful substances include, but are not limited to, toxic substances such as arsenic or antimony, carcinogens, heavy metals, and the like. When the control unit 17 determines that the waste contains harmful substances, the control unit 17 may output a warning via the output unit 13 and refuse to collect the waste.

What is claimed is:

1. A waste collecting device comprising:
an inlet unit;
an X-ray inspection device configured to acquire waste information on waste thrown into the inlet unit; and
a processor configured to:
specify a category of the waste based on the waste information;
determine whether the category of the waste matches a predetermined category;
output a determination result via an output unit;
authenticate a user who throws the waste into the inlet unit;
store, in a storage unit, for each of a plurality of users living in an apartment complex, a number of times that or a frequency at which a category of waste thrown into the inlet unit by each user within a predetermined period matches the predetermined category; and
determine a maintenance fee of the apartment complex, issued for each of the users, based on the number of times or the frequency.

2. The waste collecting device according to claim 1, wherein the processor is configured to authenticate a user who throws the waste into the inlet unit, and to provide an incentive to the user in a case where the category of the waste matches the predetermined category.

3. The waste collecting device according to claim 1, wherein:
the waste information includes information on a temperature of the waste, detected by a temperature detection device; and
the processor is configured to output a warning via the output unit in a case where the temperature of the waste is equal to or higher than a reference value.

4. The waste collecting device according to claim 1, wherein:
the waste information includes an X-ray fluoroscopic image of the waste, generated by the X-ray inspection device; and
the processor is configured to specify an article contained in the waste based on the X-ray fluoroscopic image, and to determine that the category of the waste does not match the predetermined category in a case where the waste contains an article not satisfying a condition determined according to the predetermined category.

5. The waste collecting device according to claim 1, wherein the waste information includes information on a material contained in the waste, which is specified using at least one of a metal detection device and the X-ray inspection device.

6. The waste collecting device according to claim 5, wherein the processor is configured to determine that the category of the waste does not match the predetermined category in a case where the waste contains a material not satisfying a condition determined according to the predetermined category.

7. A building provided with a waste collecting device, wherein the waste collecting device comprises:
an inlet unit;
an X-ray inspection device configured to acquire waste information on waste thrown into the inlet unit; and
a processor configured to:
specify a category of the waste based on the waste information;
determine whether the category of the waste matches a predetermined category;
output a determination result via an output unit;
authenticate a user who throws the waste into the inlet unit;
store, in a storage unit, for each of a plurality of users living in an apartment complex, a number of times that or a frequency at which a category of waste thrown into the inlet unit by each user within a predetermined period matches the predetermined category; and
determine a maintenance fee of the apartment complex, issued for each of the users, based on the number of times or the frequency.

8. The building according to claim 7, wherein the processor is configured to authenticate a user who throws the waste into the inlet unit, and to provide an incentive to the user in a case where the category of the waste matches the predetermined category.

9. The building according to claim 7, wherein:
the waste information includes information on a temperature of the waste, detected by a temperature detection device; and
the processor is configured to output a warning via the output unit in a case where the temperature of the waste is equal to or higher than a reference value.

10. The building according to claim 7, wherein:
the waste information includes an X-ray fluoroscopic image of the waste, generated by the X-ray inspection device; and
the processor is configured to specify an article contained in the waste based on the X-ray fluoroscopic image, and to determine that the category of the waste does not match the predetermined category in a case where the waste contains an article not satisfying a condition determined according to the predetermined category.

11. The building according to claim 7, wherein the waste information includes information on a material contained in the waste, which is specified using at least one of a metal detection device and the X-ray inspection device.

12. The building according to claim 11, wherein the processor is configured to determine that the category of the waste does not match the predetermined category in a case where the waste contains a material not satisfying a condition determined according to the predetermined category.

13. A method executed by a waste collecting device including an inlet unit, an X-ray inspection device, and a processor, the method comprising:
acquiring, by the X-ray inspection device, waste information on waste thrown into the inlet unit;
specifying, by the processor, a category of the waste based on the waste information;
determining, by the processor, whether the category of the waste matches a predetermined category;
outputting, by the processor, a determination result via an output unit;
authenticating, by the processor, a user who throws the waste into the inlet unit;
storing, in a storage unit, for each of a plurality of users living in an apartment complex, a number of times that or a frequency at which a category of waste thrown into the inlet unit by each user within a predetermined period matches the predetermined category; and determining a maintenance fee of the apartment complex, issued for each of the users, based on the number of times or the frequency.

14. The method according to claim 13, further comprising:
- authenticating, by the processor, a user who throws the waste into the inlet unit; and
- providing, by the processor, an incentive to the user in a case where the category of the waste matches the predetermined category.

15. The method according to claim 13, wherein:
the waste information includes an X-ray fluoroscopic image of the waste, generated by the X-ray inspection device; and
the method further comprises:
- specifying, by the processor, an article contained in the waste based on the X-ray fluoroscopic image; and
- determining, by the processor, that the category of the waste does not match the predetermined category in a case where the waste contains an article not satisfying a condition determined according to the predetermined category.

16. The method according to claim 13, wherein the waste information includes information on a material contained in the waste, which is specified using at least one of a metal detection device and the X-ray inspection device.

17. The method according to claim 16, further comprising determining, by the processor, that the category of the waste does not match the predetermined category in a case where the waste contains a material not satisfying a condition determined according to the predetermined category.

* * * * *